United States Patent [19]

Mateja et al.

[11] 4,374,313
[45] Feb. 15, 1983

[54] ARRANGEMENT FOR WORKING INTERNAL ROTATIONAL SURFACES OF METAL PARTS IN A CYLINDRICAL OPENING HAVING A HIGH SLENDERNESS RATIO

[75] Inventors: Ludvík Mateja, Velké Meziříčí; Zdeněk Chaloupka, Měřín, both of Czechoslovakia

[73] Assignee: Motorpal Jihlava, narodni podnik, Jihlava, Czechoslovakia

[21] Appl. No.: 213,168

[22] Filed: Dec. 4, 1980

[30] Foreign Application Priority Data

Dec. 5, 1979 [CS] Czechoslovakia ................ 8428-79

[51] Int. Cl.³ ............................................. B23P 1/12
[52] U.S. Cl. ................................ 219/69 E; 219/69 M
[58] Field of Search ............... 219/69 E, 69 D, 69 V, 219/69 M

[56] References Cited

U.S. PATENT DOCUMENTS

| 2,818,490 | 12/1957 | Dixon et al. | 219/69 E |
| 3,309,303 | 3/1967 | Bender et al. | 219/69 E |
| 3,668,105 | 6/1972 | Abt | 219/69 E |
| 3,696,014 | 10/1972 | Goodard et al. | 219/69 E |
| 3,727,023 | 4/1973 | Monnich | 219/69 E |
| 4,104,503 | 8/1978 | DiPiazza et al. | 219/69 E |

*Primary Examiner*—C. C. Shaw

[57] ABSTRACT

Arrangement for working internal rotational surfaces of metal parts in a cylindrical cavity in a blind bore or in a throughgoing opening having a high slenderness ratio. For working, the arrangement uses an electrode connected to the negative pole of a source of burning electrical impulses, the positive pole of such source being conductively connected with the worked metal part. The electrode is fixed conductively on a supporting tube which is arranged rotatably and eccentrically in a cylindrical hollow space from which it is insulated. In the course of the working operation the electrode or the workpiece rotates, and the electrode performs an axial advance relative to the workpiece.

4 Claims, 4 Drawing Figures

ARRANGEMENT FOR WORKING INTERNAL ROTATIONAL SURFACES OF METAL PARTS IN A CYLINDRICAL OPENING HAVING A HIGH SLENDERNESS RATIO

This application is related to the coassigned application of Mateja et al Ser. No. 213,169, filed Dec. 4, 1980, now U.S. Pat. No. 4,363,950.

BACKGROUND OF THE INVENTION

This invention relates to an arrangement for the working (finishing) of internal surfaces of metal parts in a cylindrical opening having a high slenderness ratio, possibly in a cylindrical throughgoing opening, wherein for performing such working an electrode connected to the negative pole of a source of burning electrical impulses is applied to the surface to be worked, the positive pole of such current source being conductively connected to the worked metal part.

The working of internal rotational surfaces—also called recessing surfaces—in cylindrical hollow spaces of metal parts and in cylindrical throughgoing openings therein presents substantial difficulties when hollow spaces or openings with the high slenderness ratio are involved. This is particularly so if the absolute value of the diameter of the cylindrical hollow space or of the opening amounts to several millimeters, as is the case for instance in the up-to-date injection nozzles of Diesel engines and the like.

Working by turning is difficult with a slenderness ratio D/L equal to 1/5, so that it is out of the question to apply it practially in such cases.

Working by grinding also fails when the slenderness ratio D/L is equal to $\frac{1}{8}$.

It is possible to work or finish by electrolytical working of internal rotational surfaces at relatively substantial depths. There are, however, drawbacks, in that the worked surface is not accurate, the diameter and shape of the worked surface is somewhat dependent upon the working time, and a satisfactory coaxiality cannot be achieved. When working by the electrolytic method, a defective, so-called guiding diameter is usually the result, i.e. the diameter of the cylindrical surface, where the required rotational surface is created, so that it is impossible to achieve a sharp edge on the junction between the guiding diameter and the worked surface.

A rather inconvenient aspect of this working process is that remnants of the electrolyte can be removed from deep openings only with with difficulty, causing further complications with processes that follow, and influencing the final quality of the product.

These working methods involve the expenditure of a large amount of labor, which of course is not desirable economically.

SUMMARY OF THE INVENTION

It is an object of this invention to provide an economical and very accurate working of rotational surfaces, particularly of cylindrical, conical, and also of other shapes, in a cylindrical cavity or in a throughgoing opening having a high slenderness ratio, wherein the diameter of such rotational surface is larger than the so-called guiding diameter, i.e. larger than the diameter of the cylindrical cavity or of the cylindrical throughgoing opening even if the dimension of the guiding diameter is about 1 mm.

The main feature of the present invention is that the electrode is fixed conductively on a supporting tube, which is arranged rotatably and eccentrically in a cylindrical guiding sleeve, the electrode being electrically insulated from the guiding sleeve. The external diameter of the sleeve corresponds to the internal diameter of the cylindrical cavity of the cylindrical throughgoing opening, so that the outline of the electrode in its introductory position is in an axial view equal to or smaller than the outline of the cylindrical guiding sleeve; a channel may be provided in a guiding sleeve terminating into the space in which the electrode is disposed.

The cylindrical guiding sleeve can be provided with a holder on the end thereof which is distant from the electrode. The supporting tube and the channel can be connected to a rinsing arrangement.

An advantageous embodiment of the invention is one wherein the insulation between the cylindrical guiding sleeve and the supporting tube is formed by an insulating filling of the cylindrical guiding sleeve where the supporting tube is rotationally arranged, a channel being provided in the insulating filling.

The arrangement according to the present invention may be widely applied, particularly in the working of parts having a small guiding diameter, as is the case for instance with up-to-date injectors of Diesel engines, small hydraulic elements, and the like. The invention permits the achievement of an accuracy larger than 1 micron as far as coaxiality, circularity, and roughness of the worked surface are concerned.

DESCRIPTION OF THE DRAWINGS

Examplary embodiments of arrangements according to the invention are diagrammatically illustrated in the attached drawings, wherein.

DESCRIPTION OF PREFERRED EMBODIMENTS

Figure 1:
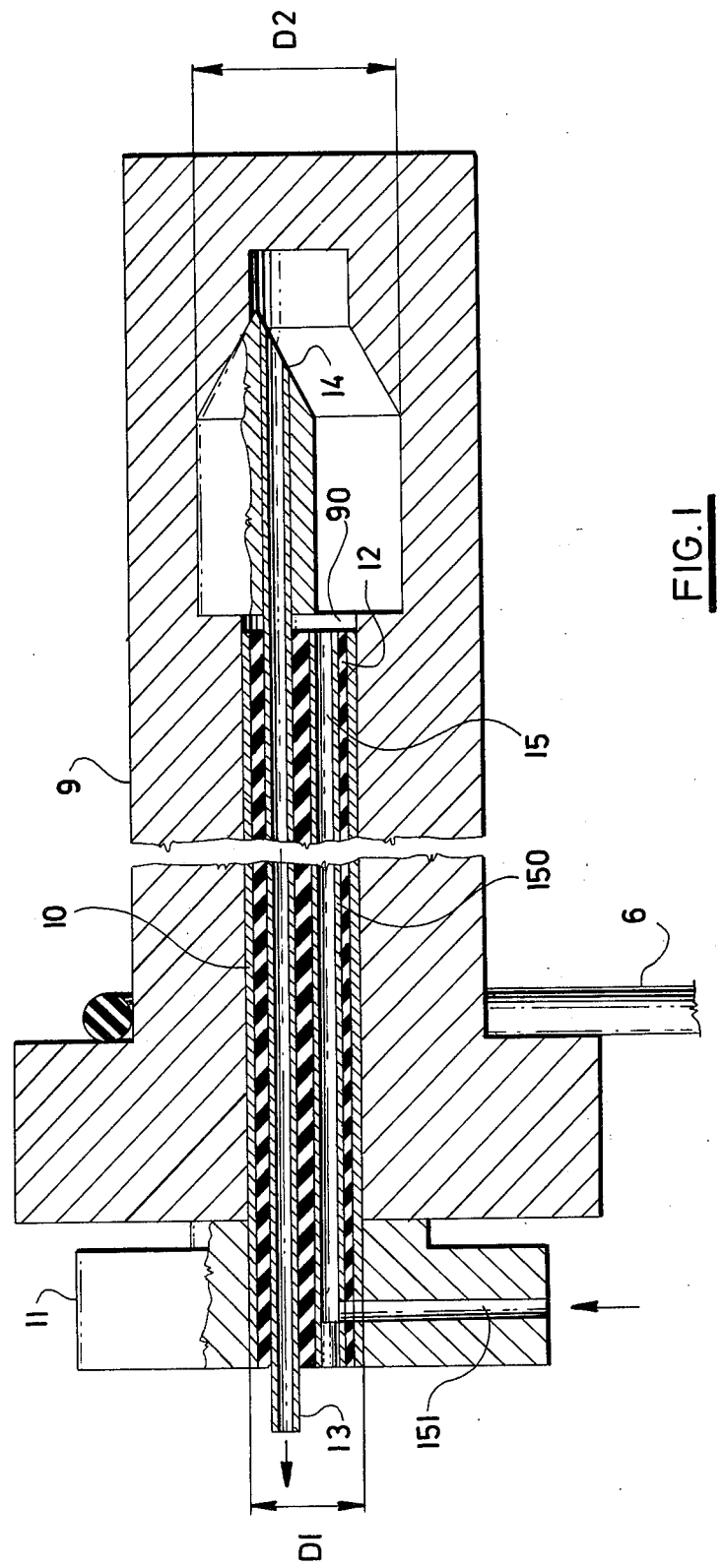
FIG. 1 is a view in longitudinal axial section through an electrode, the cylindrical guiding sleeve therefor and the part being worked by the electrode.
Figure 2:
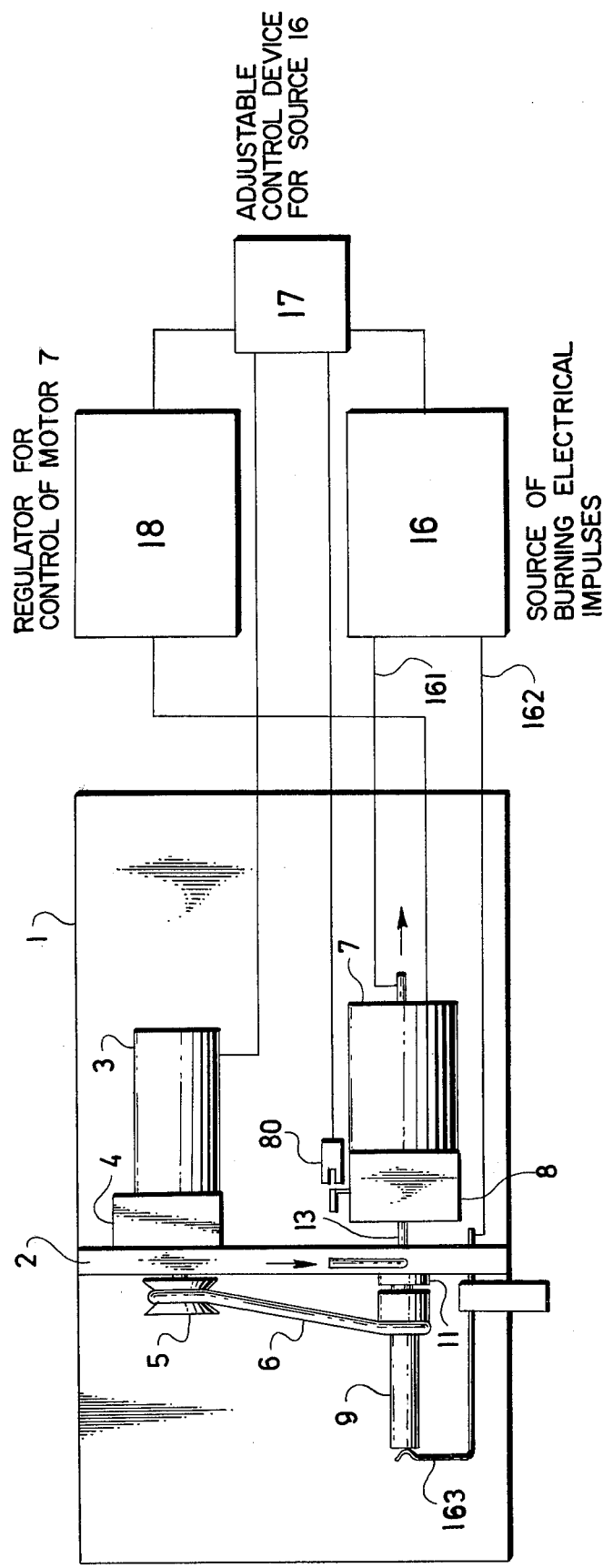
FIG. 2 is an overall top plan view of the entire arrangement.

Referring first to FIG. 2, a transverse plate 2 is shown fixed to a support 1, an electric motor 3 which provides the working drive of the arrangement and which has a gear case 4 and a pulley 5 being affixed to the plate 2. Motor 3 drives a workpiece 9 rotatably along its axis by means of a belt 6 which is entrained about the pulley 5 and the workpiece 9, as shown in FIGS. 1 and 2.

Also mounted upon the support 1 is an electric motor 7 having a gear case 8, motor 7 providing for the rotary microadvance of the workpiece and the electrode relative to each other. The workpiece 9 has a circular cylindrical bore 90 therein having a diameter D1, a cylindrical guiding sleeve 10 being disposed within the bore 90. A holder 11 is secured to the outer end of the sleeve 10, holder 11 being secured to the transverse plate 2. As explained, the workpiece 9 is rotated by the motor 3 acting through the belt 6, such belt being made of rubber and the like.

A supporting tube 13 is freely rotatably mounted within the sleeve 10 in an insulating filling 12. On the forward or left (FIG. 1) end of the supporting tube there is eccentrically affixed an electrode 14. It will be seen that the supporting tube is arranged eccentrically in the guiding sleeve 10.

The size of the electrode 14 is advantageously chosen so that when it is turned into the introductory position, i.e. into a position in which it together with the cylindrical guiding sleeve 10 may be inserted into the cylindrical cavity of the workpiece 9, the external outline of the electrode in an axial view is equal to or smaller than the outline of the cylindrical guiding sleeve 10.

The internal space of the guiding tube 13 is interconnected with the space in the workpiece wherein the electrode 14 is disposed. The surface of the electrode 14 is so shaped prior to use that in a certain eccentric position thereof with respect to the guiding sleeve 10, or in position of its maximum eccentricity, its external outline corresponds to the outline of the rotational surface which is to be made in the desired zone of the cylindrical cavity or bore 90 in the workpiece.

In arrangements designed for the working of internal rotational surfaces in a circular cylindrical cavity 90, a channel 15 leading from the space wherein the electrode 14 is disposed is provided in the insulating filling 12, channel 15 being formed by a tube 150 and a bore 151 in the holder 11.

The supporting tube 13 and the channel 15 are connected to a known rinsing arrangement (not shown), which serves for the supplying of a suitable liquid into the space wherein the electrode 14 is disposed and for the removal of such liquid together with products originating in the course of burning of the surface being by the electrode.

In arrangements designed for the working of internal rotational surfaces in a circular cylindrical throughgoing opening, no channel 15 is required since the liquid together with products originated in the course of burning of the electrode 14 are removed by way of the throughgoing opening in the workpiece 9.

The arrangement of the invention also includes a source 16 of burning electrical impulses, the negative pole of which is connected to the supporting tube 13 through a conductor 161 and thus also to the electrode 14, the positive pole of source 16 being connected by a conductor 162 and by a resilient contact 163 with the workpiece 9.

The source 16 of burning electrical impulses is controlled by an adjustable control device 17, to which a regulator 18 of the electric motor 7 is also connected. The regulator 18 permits the control of the electric motor 7 in the course of the electroerosive working in dependence upon the voltage between the electrode 14 and the worked rotational surface.

The described arrangement operates as follows: The workpiece 9 to be worked is shifted on the cylindrical guiding sleeve 10. The workpiece 9 is thereafter encompassed by the belt 6, the electric motor 7 is started by the control device 17, whereby the workpiece 9 is rotated at a speed of about 600-1000 rpm, the source 16 of burning electrical impulses is energized, the rinsing arrangement and the electric motor 7 are started. Motor 7 by way of the gear case 8 turns the electrode 14 by microadvance, the electrode then starting to work the respective surface on the principle of electroerosive working. The working proceeds as long as the required shape of the worked surface is achieved, whereafter the arrangement is brought to a standstill. The electrode 14 is turned into its initial position, the belt 6 is removed, and the workpiece 9 is taken off from the cylindrical guiding sleeve 10, after which another and further workpiece 9 is mounted thereon and the described process is repeated.

The burning parameters are chosen according to the required roughness of the worked surface, such parameters being optimally adjustable by the control device 17 and by the counter 80 which operates a microswitch.

Figure 3:
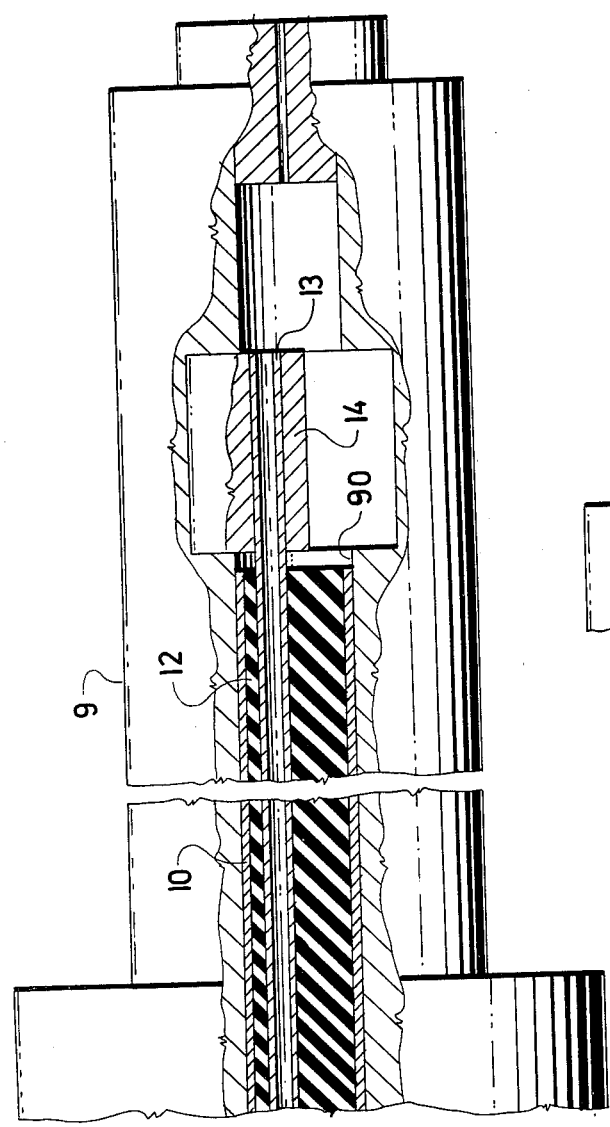
FIG. 3 is a view in longitudinal axial section showing a first embodiment of a worked part wherein two consecutive processes according to the invention have been employed.
Figure 4:
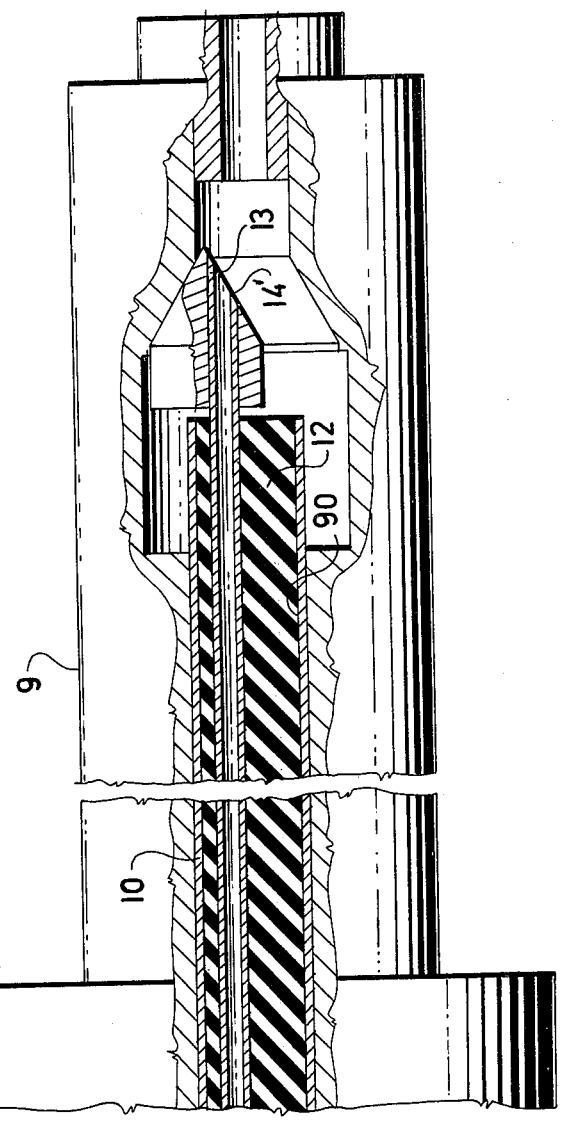
FIG. 4 is a view similar to FIG. 3 of a second embodiment of a worked part wherein two consecutive processes according to the present invention have been used.

With the embodiment of the apparatus shown in FIGS. 3 and 4, the enlargement in the bore of the workpiece is first formed as by machine or by means of a suitably shaped cylindrical electrode 14 (FIG. 3), after which another electrode 14' (FIG. 4) is inserted into the thus formed circular cylindrical recess. The electrode 14' is then turned into the position shown, and by axial microadvance of the electrode 14' obtained for instance by the means described in connection with the first illustrated embodiment or by means of that described in Czechoslovak certificate of authorship of an invention No. 170,857, with simultaneous rotation the required conical surface is subsequently electrically eroded or burned out.

It is also possible to operate the described apparatus in such manner that the workpiece 9 rotates during the course of the working, and the electrode 14' moves only by way of an axial microadvance.

Referring to FIG. 1, wherein the maximum diameter of the worked rotational surface is indicated as D2, it is possible by practicing the invention described herein to achieve a ratio D2/D1 substantially equal to 5/3, D1 being the above described guiding diameter of the workpiece 9.

Although the invention is illustrated and described with reference to a plurality of preferred embodiments thereof, it is to be expressly understood that it is in no way limited to the disclosure of such preferred embodiments but is capable of numerous modifications within the scope of the appended claims.

We claim:

1. An arrangement for working internal rotational surfaces of a metal part having a cylindrical opening or in a cylindrical through-going opening having a high slenderness ratio, comprising a working electrode connected to the negative pole of a source of burning electrical impulses, the positive pole of which is conductively connected with the metal part, and cylindrical guiding sleeve having a bore therethrough, a supporting tube and an electrode, the electrode being fixed conductively on the supporting tube, said tube being arranged rotatably and eccentrically in the cylindrical guiding sleeve from which it is insulated, the external diameter of the sleeve corresponding to the internal diameter of the cylindrical opening of the metal part, the cross-section of the electrode when the electrode is in its position for insertion in the opening of the metal part at the maximum corresponding to the diameter of the bore through the cylindrical guiding sleeve.

2. An arrangement as in claim 1, wherein the insulation between the cylindrical guiding sleeve and the supporting tube is provided by an insulating filling of the cylindrical guiding sleeve, and the supporting tube in such filling is rotatably arranged.

3. An arrangement as in claim 2, wherein a channel for the discharge of burned products of the working operation is provided in the insulating filling.

4. An arrangement as in claim 1, comprising a drive for the supporting tube, such drive providing a rotational microadvance of the electrode, and a working drive for rotating the workpiece relative to the electrode.

* * * * *